US006953335B2

(12) United States Patent
Fogliani et al.

(10) Patent No.: US 6,953,335 B2
(45) Date of Patent: Oct. 11, 2005

(54) METHOD AND APPARATUS FOR REDUCING NITROGEN DIOXIDE ($NO_2$) EMISSIONS IN A FLUELESS HEATING APPLIANCE

(76) Inventors: Giuseppe Fogliani, Via Salvo D'Acquisto, 11, I-41043 Formigine (IT); Enrica Baraldi, Viale Isonzo, 49, I-41049 Sassuolo (IT); Gunther Berthold, Via Fornacci, 34, I-41014 Solignano di Castelvetro (IT); Don Denton, 111 Triple Crown, Bowling Green, KY (US) 42104

( * ) Notice: Subject to any disclaimer, the term of this patent is extended or adjusted under 35 U.S.C. 154(b) by 0 days.

(21) Appl. No.: 10/477,309

(22) PCT Filed: May 6, 2002

(86) PCT No.: PCT/IB02/01520

§ 371 (c)(1),
(2), (4) Date: Nov. 10, 2003

(87) PCT Pub. No.: WO02/090837

PCT Pub. Date: Nov. 14, 2002

(65) Prior Publication Data

US 2005/0051154 A1 Mar. 10, 2005

(30) Foreign Application Priority Data

May 8, 2001 (IT) .................................... MO2001A0086

(51) Int. Cl.[7] ................................................ F23Q 23/00
(52) U.S. Cl. ............................................ 431/25; 431/78
(58) Field of Search ................................ 431/2, 19, 25, 431/29, 75, 76, 78; 126/86, 94, 92 R, 92 AC, 92 B, 512, 96, 92 A, 95, 85 R; 423/397

(56) References Cited

U.S. PATENT DOCUMENTS

| | | | | | |
|---|---|---|---|---|---|
| 879,762 | A | * | 2/1908 | Gallagher | 126/86 |
| 1,664,277 | A | * | 3/1928 | Zick | 126/92 AC |
| 2,859,742 | A | * | 11/1958 | Ruhl | 126/92 AC |
| 2,985,438 | A | | 5/1961 | Prowler | |
| 4,427,434 | A | * | 1/1984 | Eastin | 71/54 |
| 4,543,056 | A | * | 9/1985 | Sakakibara | 431/76 |
| 4,726,353 | A | * | 2/1988 | Clawson | 122/18.4 |

FOREIGN PATENT DOCUMENTS

| | | |
|---|---|---|
| JP | 57 192741 | 11/1982 |
| JP | 58 002550 | 1/1983 |
| JP | 08 094009 | 4/1996 |
| JP | 08 327152 | 12/1996 |
| JP | 09 138001 | 5/1997 |

* cited by examiner

*Primary Examiner*—Stephen Gravini
(74) *Attorney, Agent, or Firm*—Jordan and Hamburg LLP

(57) ABSTRACT

An apparatus for reducing nitrogen dioxide emissions in a flueless heating appliance or heater includes a heat-exchanger for exchanging heat contained in fumes produced by the combustion of a fuel in the heating appliance. A heating appliance or heater without a fume flue includes a burner supplied with a gaseous fuel, an evacuator for discharging into an environment outside the heater fumes produced by combustion of the fuel, and a heat-exchanger for receiving the fumes from the burner and sending them to the evacuator. A method for reducing nitrogen dioxide emissions in a flueless heating appliance, supplied with a gaseous fuel, includes removing heat in a controlled manner from fumes produced by the combustion of the fuel so as to minimize the conversion of NO into NO2 in the fumes.

33 Claims, 6 Drawing Sheets

METHOD AND APPARATUS FOR REDUCING NITROGEN DIOXIDE ($NO_2$) EMISSIONS IN A FLUELESS HEATING APPLIANCE

BACKGROUND OF THE INVENTION

1. Field of the Invention

The present invention relates to a method and apparatus for reducing nitrogen dioxide emissions in a flueless heating appliance or heater, i.e. a heating appliance or heater in which fumes produced by the combustion of the fuel with which the heating appliance or heater is supplied are discharged directly into the environment in which the appliance is located.

2. Prior State of the Art

In this type of heating appliance or heater it is essential for the toxic emissions, in particular carbon monoxide (CO) and nitrogen oxide ($NO_2$), to be kept as low as possible; it is also essential that the percentage of oxygen in the environment in which the heating appliance or heater is located does not fall below a preset level.

This is essential in order to safeguard health of persons who are in the nearby environment to the heater.

Particular attention is paid to minimising $NO_2$ emissions, which, until now, has not been satisfactorily achieved.

Known flueless heating appliances include a gas combustion system generally consisting of a pressure adjuster, a gas valve, a burner, a flame igniter, a monitor and a conduit supplying the gas fuel.

The above system is contained in a heater body provided with a deflector for channelling the combustion products outside and reducing the temperature of the heater body by shielding it.

These heating appliances or heaters can be provided with different types of burners, for example, convection burners or radiant burners, that are aspirated naturally or with assisted aspiration. The gas valve may be manually controlled or thermostatically controlled with finite or variable heat adjustment that is manually or remotely controlled. These heating appliances or heaters generally operate without electric power but can be provided with electric ignition and fans.

Flueless heating appliances or heaters are also known which contain pieces of artificial wood that are actually made of ceramic fibre, cement or a mixture of cement and ceramic fibre and are used to give the illusion of the combustion of pieces of wood. The combustion systems used in this type of heating appliance or heater are substantially the same as those mentioned before.

The prior-art flueless heating appliances or heaters, despite the progress made over the last few years, have not yet effectively solved the problem of excessive $NO_2$ emissions.

SUMMARY OF THE INVENTION

The present invention aims to provide a flueless heating appliance or heater, in which the percentage of nitric oxides, in particular $NO_2$, in the combustion products is extremely low.

According to a first aspect of the present invention a flueless heating appliance or heater that produces reduced nitrogen dioxide emissions is provided. The appliance includes a heater body in which a burner is positioned that is fed with a gaseous fuel, a supply source for supplying the burner with gaseous fuel, a regulator for regulating the supply of fuel, an igniter for combusting the fuel, a monitor for monitoring combustion, an evacuator for discharging fumes produced by the combustion of the fuel, into an outside environment a heat-exchanger for removing heat from the fumes and being positioned between the burner and the evacuator.

According to a further aspect of the present invention, a method for reducing nitrogen dioxide ($NO_2$) emissions in a flueless heating appliance is provided, comprising supplying the heating appliance or heater with a gaseous fuel, causing combustion of gaseous fuel in heating appliance or heater, and sending fumes produced by the combustion of the fuel towards an opening of the heating appliance or heater that communicates with an environment external to the heating appliance or heater in order to discharge the fumes into the outside environment. The method further involves removing heat from the fumes before they reach the opening. Heat removal from the fumes is carried out in order to minimise the conversion of nitrogen oxide (NO) in the fumes into $NO_2$ during cooling.

According to the method and apparatus of the present invention the fumes produced by the combustion of the fuel, which is combusted in the heating appliance or heater, are progressively and slowly cooled without undergoing sudden cooling, as generally occurs in prior-art devices and the fumes remain at a relatively high temperature for a sufficiently long time to drastically limit conversion of NO into $NO_2$ before being discharged into the outside environment through the evacuator.

Brief Description of the Drawings

Further characteristics and advantages of the present invention will be apparent from the following exemplifying and non-limiting description, and from the attached drawings, in which.

DETAILED DESCRIPTION OF A PREFERRED EMBODIMENT OF THE INVENTION

Figure 1:
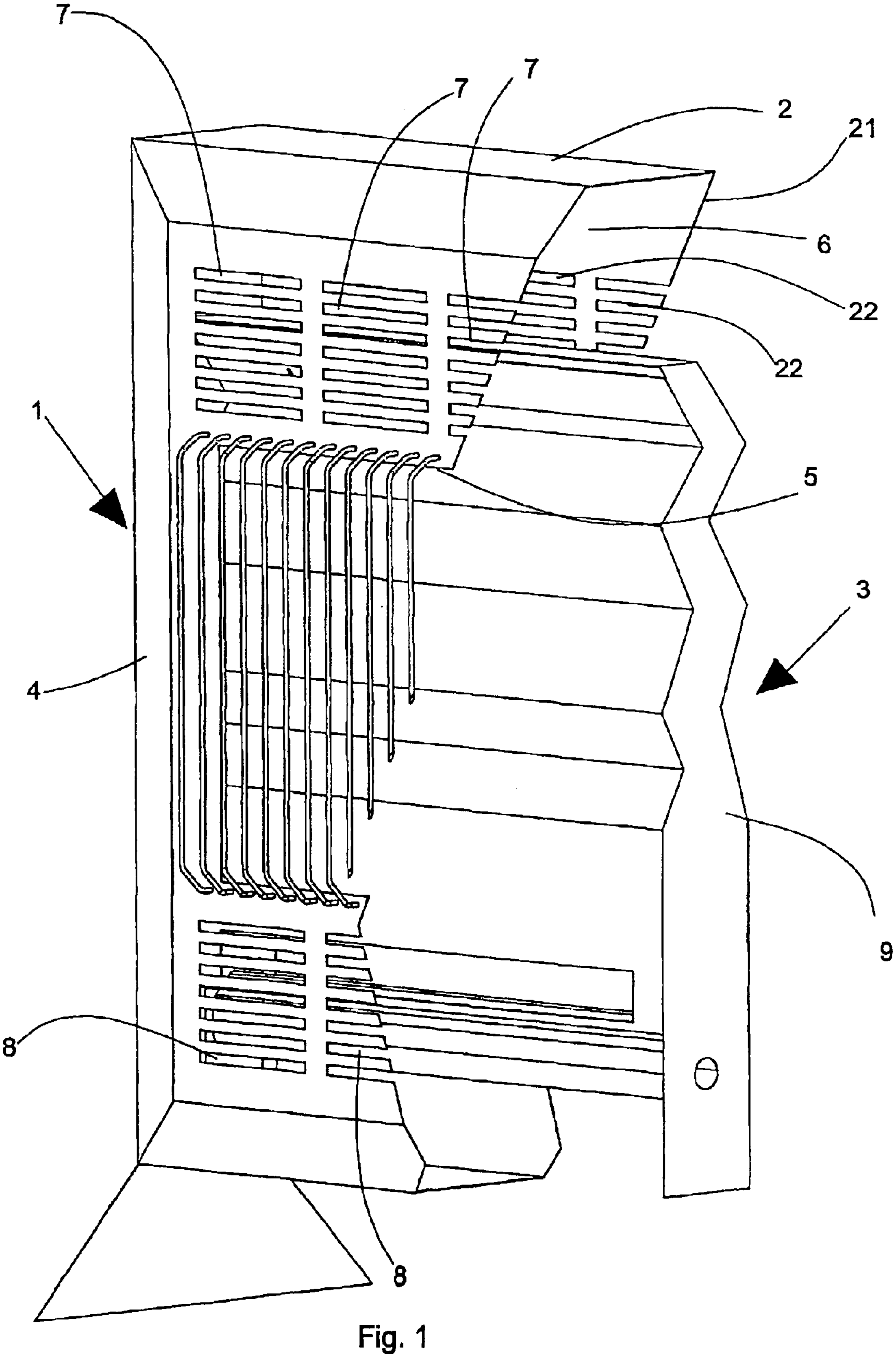
FIG. 1 is a partially exploded perspective view of a heating appliance or heater according to the invention.
Figure 2:
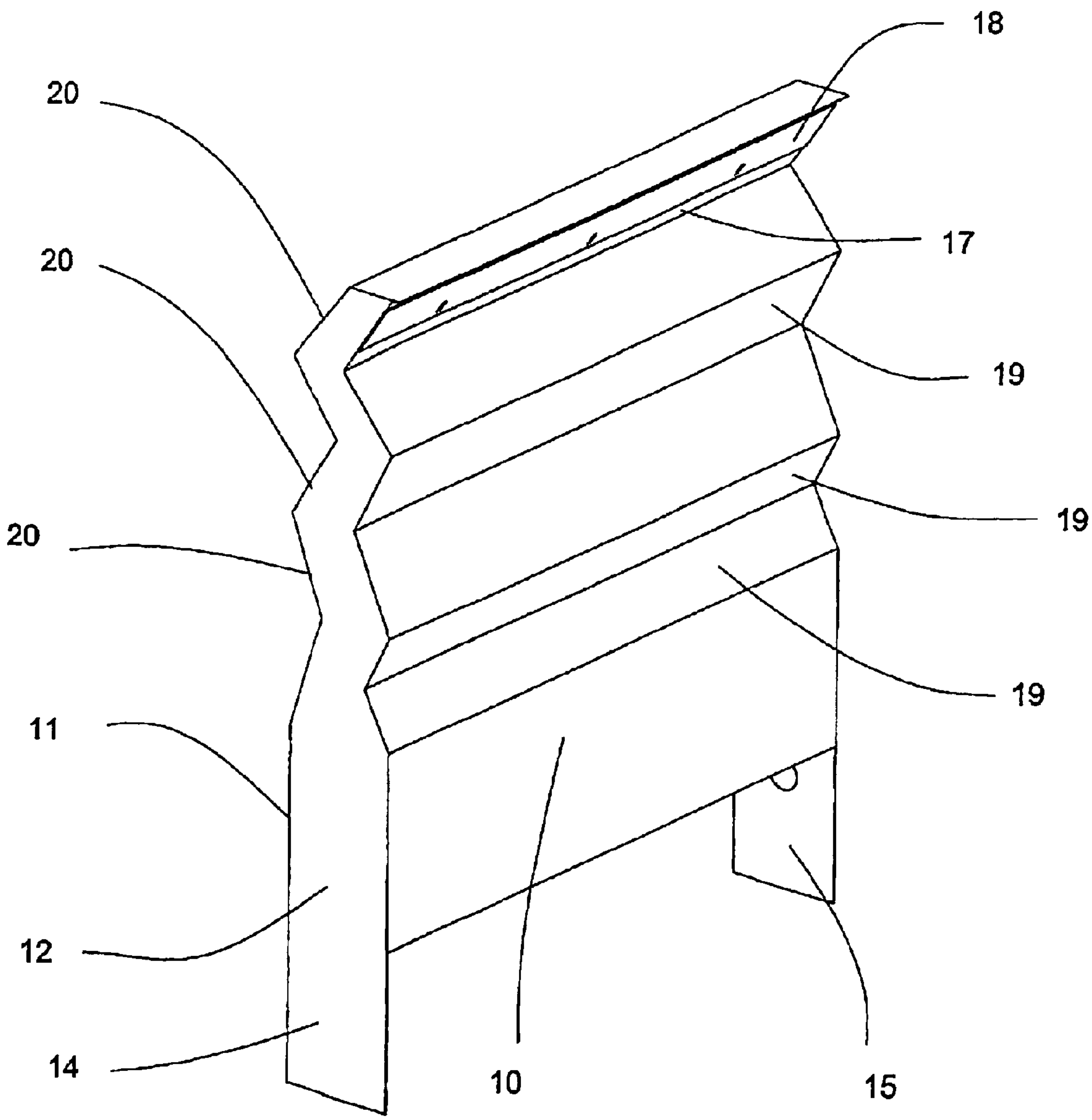
FIG. 2 is a perspective view of an internal heat-exchanger and fume-cooling device according to the invention.
Figure 3:
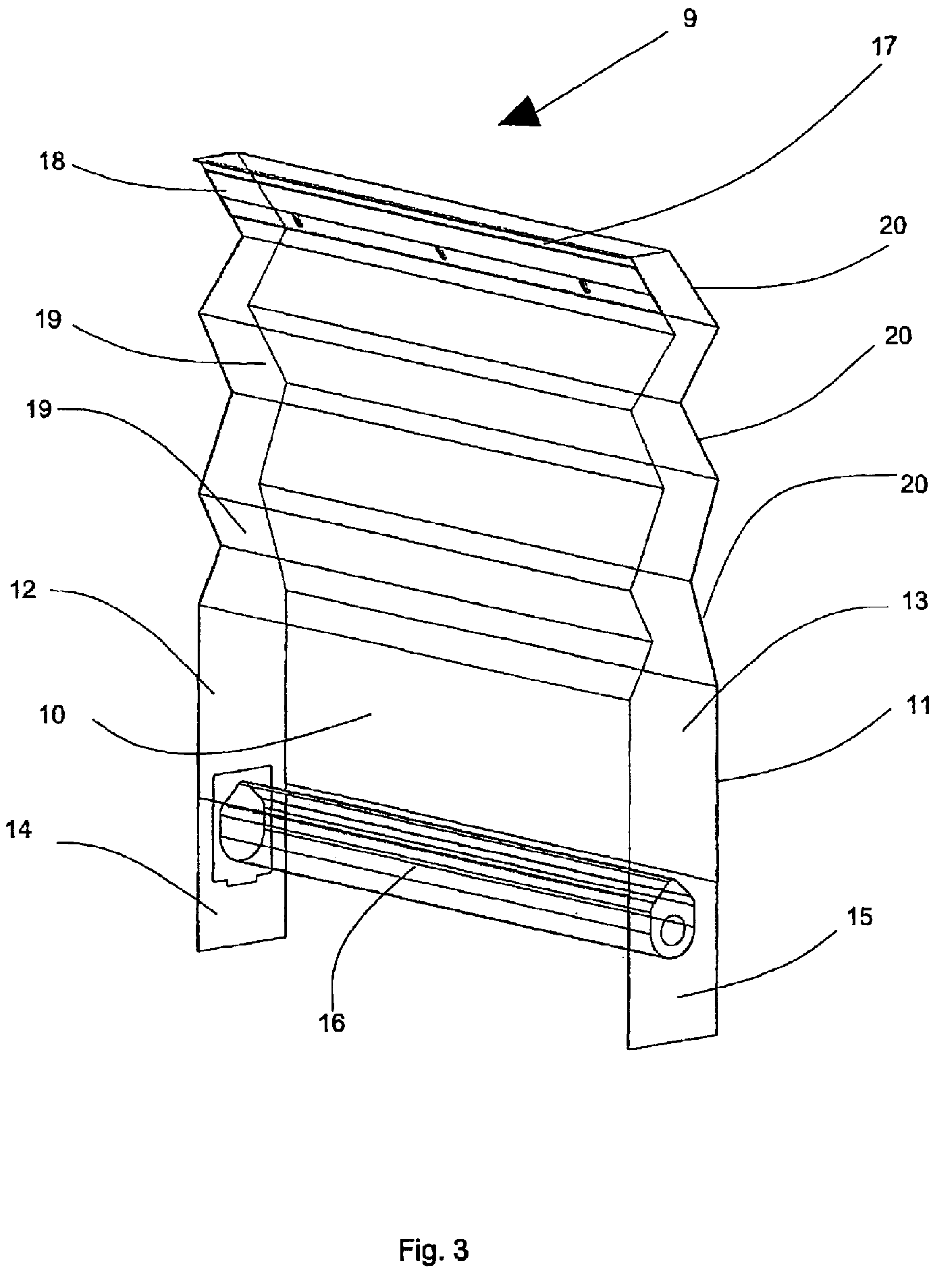
FIG. 3 is a transparent perspective view of the apparatus of FIG. 2.
Figure 4:
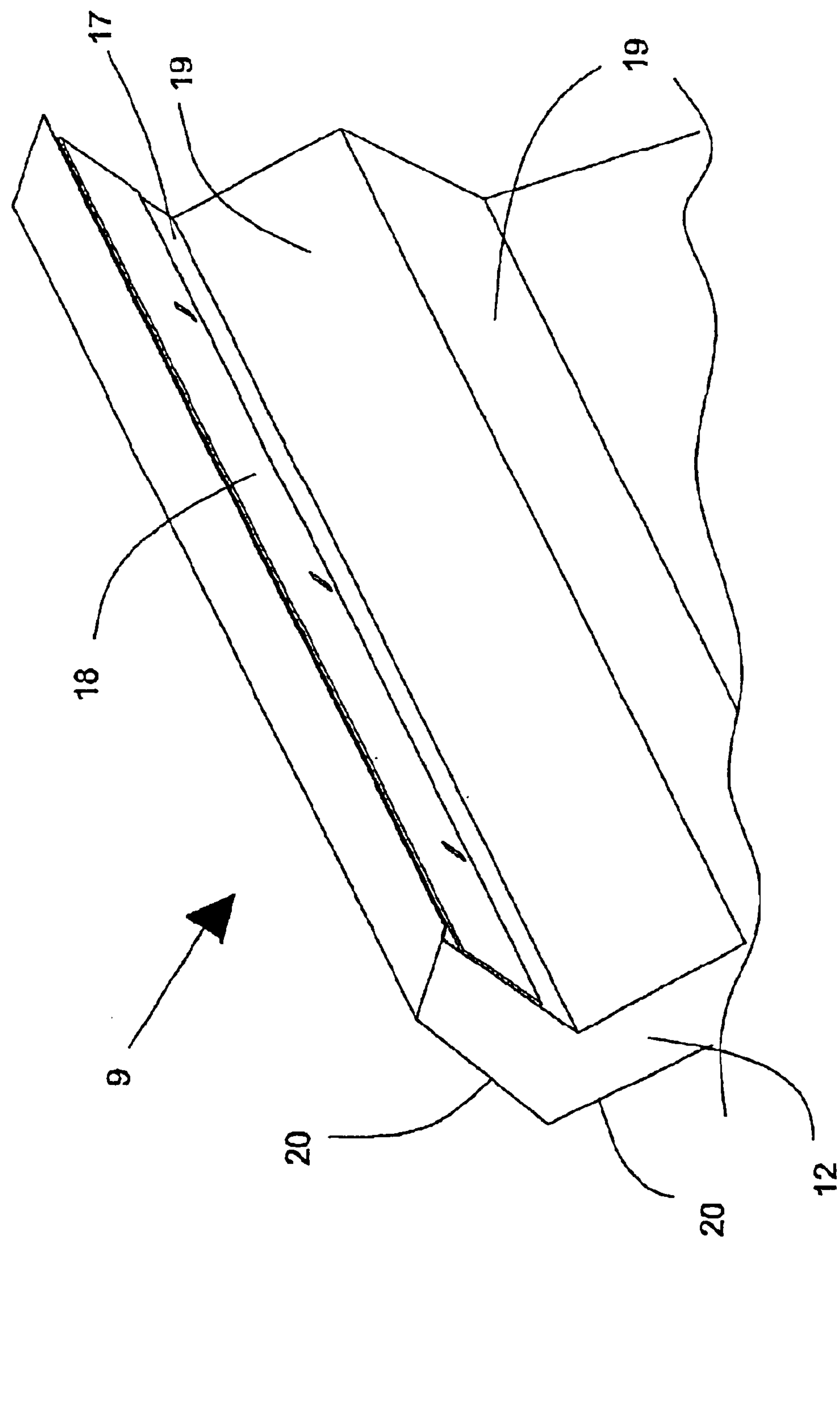
FIG. 4 is an enlarged detail of the apparatus of FIG. 2.

FIG. 1 shows a heating appliance or heater 1 that includes a heater body 2 inside which an internal heat-exchanger and fume-cooling device 3 according to the invention is arranged. The heater body 2 includes a front wall 4 in which an opening 5 is mounted, in a substantially central position. The opening enables the inner space 6 of the appliance 1 to communicate with the outside environment. A series of top slits 7 are present in an upper zone of the front wall 4 and in a lower zone of the front wall 4 there is a series of bottom slits 8.

In a rear wall 21 of the heater body 2 there is a further series of top slits 22 substantially arranged to face the top slits 7 of the front wall 4.

An internal heat-exchanger and fume-cooling device 3 according to the invention is positioned in the inner space 6 of the heating appliance or heater 1. The internal heat-exchanger and fume-cooling device includes a heat-exchanger 9 defined by a frontal wall 10 and by a rear wall 11, connected together by side walls 12, 13. The side walls 12, 13 are provided with respective bottom appendages 14, 15 supporting a burner 16 that is supplied with a gaseous fuel. The burner 16 is preferably one that is capable of producing a dark-blue Bunsen-type flame.

The burner 16 is arranged to occlude most of the bottom slits 8, so as to limit the quantity of secondary air that enters from the outside into the inner space 6, in the zone in which the burner 16 is arranged.

The heat-exchanger 9 transfers towards the outside environment, mainly through the opening 5, part of the heat content of the fumes produced by the combustion of the gaseous fuel.

The heat-exchanger 9 receives the fumes produced by the combustion of the gaseous fuel and discharges them through an evacuation opening 17 towards the top slits 7 through which the fumes reach the outside environment. The opening 17 is located at the top zone of the heat-exchanger 9 and is preferably provided with a choke suitable for modifying the size of the opening 17 in order to regulate the draft of the heating appliance 1 according to variations in thermal power output.

The dimensions of the heat-exchanger 9 are such that the fumes that pass through it cool down slowly without undergoing sudden decreases in temperature, that is, without being subjected to a so-called 'quenching' phenomenon, and reach the evacuation opening 17 at a temperature that is lower than the minimum temperature at which the NO can be converted into $NO_2$. The slow cooling of the fumes drastically reduces the conversion of the NO in the fumes into $NO_2$, so that the $NO_2$ content in the fumes, when the fumes are ejected into the outside environment through the evacuation opening 17 and the top slits 7 of the body 2, is extremely low and is compatible with the $NO_2$ levels that are permissible in the emissions from flueless heating appliances, according to current or future regulations. The heat-exchanger 9 can be used to effectively control the cooling of the fumes to prevent the phenomenon of 'quenching', over a wide range of use conditions of the heating appliance, substantially between operation at maximum power, i.e. at nominal power, and operation at minimum power, normally at 50% of nominal power.

In the embodiment shown in FIGS. 1 to 4 the front wall 10 and rear wall 11 of the heat exchanger are made with a series of respective consecutive sections 19, 20 of wall that are tilted alternately on opposite sides to constitute a vertical zigzag arrangement of adjacent wall sections.

In this way, the path along which the fumes travel to reach the evacuation opening 17 is lengthened and the heat-exchange surface is increased across which the heat contained in the fumes is transmitted to the outside environment before the fumes escape from the evacuation opening 17. This conformation of the heat-exchanger 9 enables the same overall height dimensions as those of a prior-art heating appliance to be maintained.

The conformation of the heat-exchanger 9 is simple and conveniently produced and can be achieved with a minimal number of parts and using manufacturing methods with which manufacturers of shaped sheet metal and fitters are thoroughly familiar.

The geometrical configuration of the heat-exchanger 9 shown is just one of the many different types of geometrical configuration that are possible. The geometrical configuration of the heat-exchanger 9 is chosen according to the criterion of allowing transmission of the heat from the fumes towards the outside environment to be achieved, during the interval of time during which the fumes cross the heat-exchanger 9, which enables slow and progressive cooling of the fumes that is suitable for avoiding the phenomenon of quenching and lowers the temperature of the fumes below the minimum temperature at which NO can be converted into $N_2$ before the fumes come into contact with the outside environment, by exiting through the evacuation opening 17 and the top slits 7. Through the further top slits 22 ambient-temperature air from the environment outside the heating appliance or heater 1 enters the inside of the body 2 and mixes with the fumes exiting the evacuation opening 17 and cools them before they exit into the outside environment through the top slits 7 and while maintaining temperature conditions of the fumes such as not to allow the transformation of NO into $NO_2$.

In this way, it is also possible to ensure that the fumes that exit from the top slits 7 are not at a temperature that is dangerous for persons near the opening, which obviates the need for deflecting baffle plates or other protective devices. The heating appliance or heater 1 can be provided with an adjustor or regulator for adjusting the supply of fuel to the burner 16. The adjustor may include one or more valves, manual, and/or automatic and/or programmable, inserted in the fuel supply pipe.

The heating appliance 1 or heater can also be provided with a first safety device to monitor combustion of the fuel and interrupt the fuel supply if the burner 16 fails to operate properly. A further safety device may also be provided to interrupt the fuel supply if the concentration of CO in the environment in which the heating appliance is located exceeds respective preset maximum values.

Figure 5:
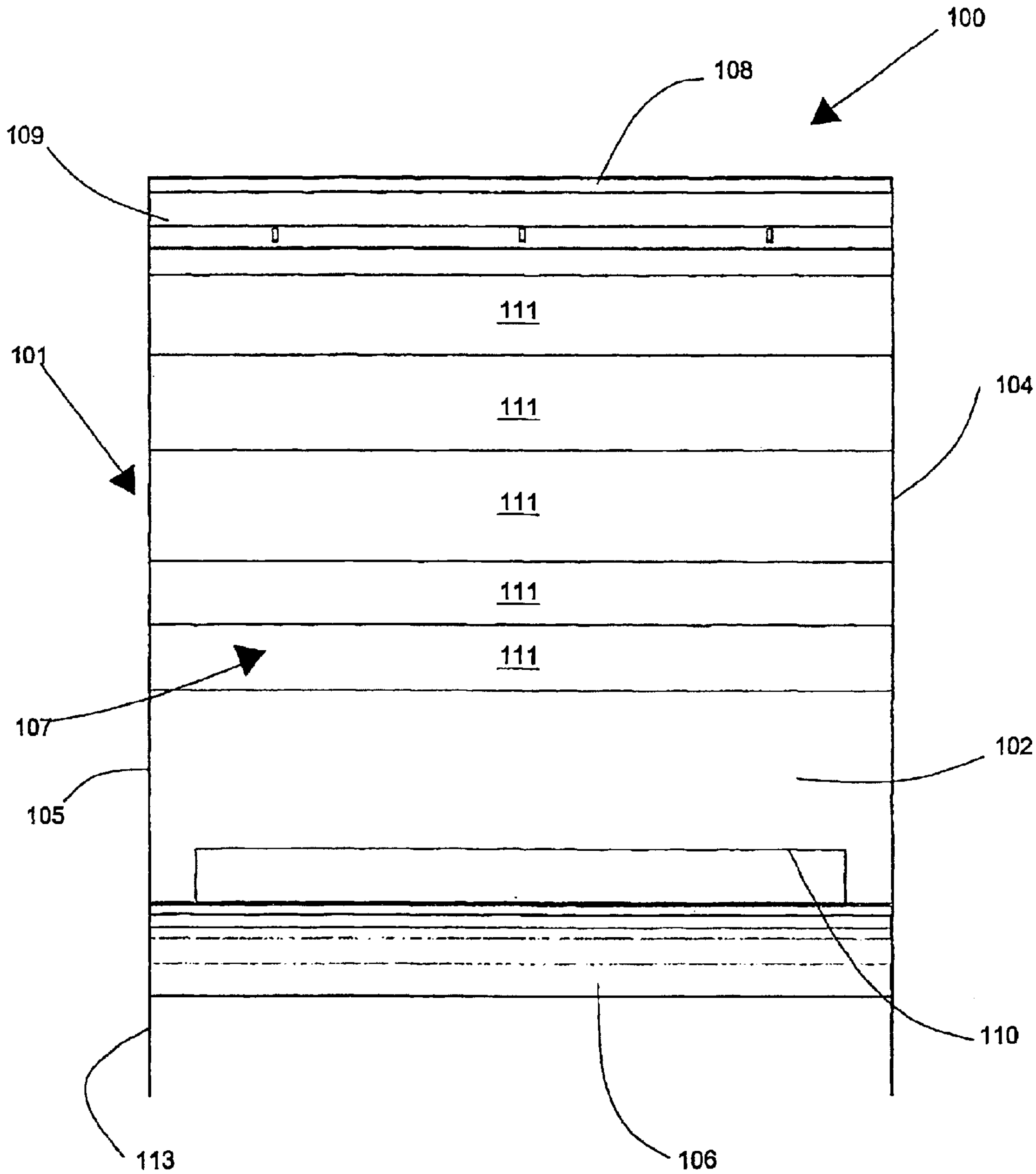
FIG. 5 is a front view of an alternative embodiment of the internal heat-exchanger and fume-cooling device according to the invention.
Figure 6:
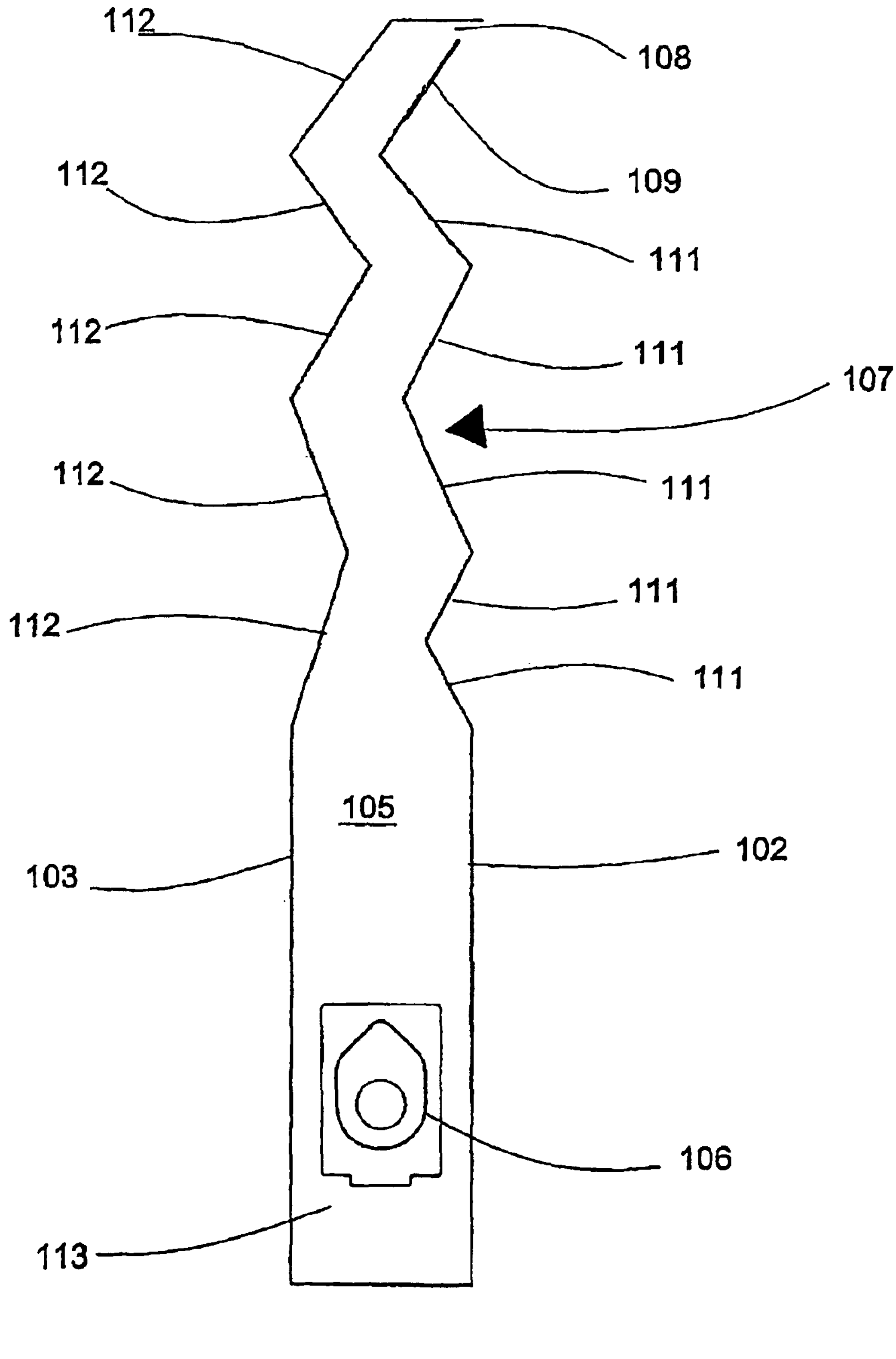
FIG. 6 is a schematic section taken along a plane VI—VI of FIG. 5.

FIGS. 5 and 6 show an alternative embodiment of the apparatus according to the invention.

FIGS. 5 and 6 show a heating appliance or heater 100 that includes a body 101 constituting the apparatus according to the invention. The body 101 has a front wall 102 and a rear wall 103 connected by side walls 104 and 105. Inside the bottom of the body 101 a burner 106 is arranged in which combustion of fuel with which the heating appliance 100 is fed takes place.

At the top of the body 101 there is a heat-exchanger 107 for dissipating, in the outside environment surrounding the appliance or heater 100, part of the heat contained in the fumes generated by the combustion of the fuel in the burner 106. To increase the heat-exchange surface of the heat-exchanger 107, the top part of the front wall 102 and the top part of the rear wall 103 consist of sections of wall, 111 and 112 respectively, which are alternately tilted on opposite sides. This allows maintenance of the same height for the appliance 100, while providing a greater heat-exchange surface for the heat-exchanger 107.

The heat-exchanger 107 is provided at the top with an evacuation opening 108 through which the fumes are ejected into the environment outside the heating appliance. The size of the opening 108 can be varied by a choke 109, for example in the form of a gate valve, that is associated with the evacuation opening 108.

In the bottom part of the front wall 102 of the body 101 there is an opening 110 that enables viewing of the flames produced by the burner 106 from the outside of the heater.

The body 101, at the bottom 113, communicates with the outside environment to enable a flow of secondary air towards the burner 106.

In practice, materials, dimensions and details of execution may be different from, but technically equivalent to those described herein above without departing from the scope of the present invention.

What is claimed is:

1. Flueless, low nitrogen dioxide-emitting heater comprising:

a heater body;

a burner for burning a fuel to produce fumes comprising nitrogen oxide, said burner being positioned in said heater body;

a fuel supply for supplying said burner with said fuel;

an igniter for combusting said fuel;

an evacuator for discharging into an environment exterior to said heater body, said fumes comprising nitrogen oxide, produced by combustion of said fuel;

a heat-exchanger positioned between said burner and said evacuator for providing heat-exchange with said fumes in such a way as to lower a temperature of said fumes from a first temperature through progressively lower intermediate temperatures to a final temperature that is below a minimum temperature at which nitrogen oxide (NO) in said fumes is capable of being converted into nitrogen dioxide ($NO_2$), in order to minimize a final $NO_2$ content of said fumes when said fumes are discharged from said evacuator into said environment exterior to said heater body.

2. Heater according to claim 1, wherein said heat-exchanger comprises a front wall, a rear wall and side walls connecting the front and rear walls.

3. Heater according to claim 2, wherein said front wall and said rear wall comprise a plurality of wall sections, with each wall section being tilted alternately oppositely to one another with respect to a vertical plane.

4. Heater according to claim 3, further comprising a plurality of appendages positioned at a bottom of each said side wall, for supporting said burner.

5. Heater according to claim 1, wherein said evacuator further comprises an evacuation opening in a top zone of said heat-exchanger.

6. Heater according to claim 5, wherein a size of said evacuation opening is adjustable.

7. Heater according to claim 6, further comprising a choke for varying the size of said evacuation opening.

8. Heater according to claim 7, wherein said choke comprises a gate-valve.

9. Heater according to claim 1, wherein said heater body comprises a front wall; and said evacuator comprises a plurality of top openings in a top zone of said front wall.

10. Heater according to claim 9, wherein said top openings comprise slits.

11. Heater according to claim 9, wherein said evacuator comprises an evacuation opening in a top zone of said heat-exchanger and said top openings are adjacent to said evacuation opening of said heat-exchanger.

12. Heater according to claim 1, wherein said heater body further comprises a rear wall having a plurality of further top openings in a top zone thereof.

13. Heater according to claim 12, wherein said further top openings comprise slits.

14. Heater according to claim 12, wherein said openings in said rear wall substantially face said openings in said front wall.

15. Heater according to claim 1, further comprising bottom openings in a bottom zone of said heater body.

16. Heater according to claim 15, wherein said bottom openings comprise slits.

17. Heater according to claim 15, wherein said bottom openings are adjacent to said burner.

18. Heater according to claim 17, further comprising at least one opening substantially in a center of said heater body, being between said top openings and said bottom openings.

19. Heater according to claim 2, wherein said heat exchanger comprises portions of said front wall and portions of said rear wall, said front wall portions and said rear wall portions being tilted alternately oppositely to one another with respect to a vertical plane.

20. Heater according to claim 19, wherein said evacuator comprises an evacuation opening in a top zone of said heater body.

21. Heater according to claim 20, wherein a size of said evacuation opening is adjustable.

22. Heater according to claim 21, further comprising a choke for varying the size of said evacuation opening.

23. Heater according to claim 22, wherein said choke comprises a gate-valve.

24. Heater according to claim 2, wherein said front wall further comprises a window in a bottom zone of said front wall.

25. Heater according to claim 24, wherein said window is adjacent to said burner.

26. Heater according to claim 1, wherein a bottom part of said heater body communicates with an environment external to said heater body.

27. Heater according to claim 1, wherein said burner produces a blue flame characteristic of a blue flame produced by a Bunsen burner.

28. Method for reducing nitrogen dioxide ($NO_2$) emissions from a flueless heater, comprising cooling, in a heat exchanger of the heater, hot exhaust fumes produced by combustion of a fuel in a burner of the heater, to lower a temperature of said fumes from a first temperature through progressively lower intermediate temperatures to a final temperature that is below a minimum temperature at which nitrogen oxide (NO) in said fumes is capable of being chemically converted into nitrogen dioxide ($NO_2$), in order to minimize conversion of NO into $NO_2$ in said fumes and a final $NO_2$ content of said fumes when said fumes are discharged from an evacuator of the heater into an environment exterior to said heater body.

29. A heat-exchanger for use internally in a flueless, fuel-fired heater, for removing heat from a stream of nitrogen oxide (NO)—containing fumes produced by combustion of said fuel in said heater, said heat-exchanger comprising:

a heat-exchanger body, through which combustion fumes are capable of flowing, said heat-exchanger body comprising:

a front wall, comprising a plurality of wall sections adjacent to one another, with contiguously adjacent wall sections being alternately oppositely angled to one another with respect to a reference plane;

a rear wall, comprising a plurality of wall sections adjacent to one another, with contiguously adjacent wall sections being alternately oppositely angled to one another with respect to a reference plane;

a pair of side walls connecting said front wall and said rear wall;

an evacuation opening in a top zone of said heat exchanger body for venting combustion fumes flowing through said heat-exchanger body to an environment external to said heater;

said heat-exchanger body being sized such that said walls thereof provide sufficient heat-exchange surface in contact with said combustion fumes so as to lower a temperature of said fumes from a first temperature through progressively lower intermediate temperatures to a final temperature that is below a minimum temperature at which NO in said fumes is capable of being converted into nitrogen dioxide ($NO_2$), in order to minimize a final $NO_2$ content of said fumes when said fumes are discharged into said environment exterior to said heater.

30. The heat-exchanger according to claim 29, wherein a size of said evacuation opening is adjustable.

31. The Heat-exchanger according to claim 30, wherein said evacuation opening comprises a choke.

32. The Heat-exchanger according to claim 31, wherein said choke is a gate-valve.

33. The heat-exchanger according to claim 29, further comprising a plurality of appendages positioned at a bottom of each side wall of said heat-exchanger body, for supporting a burner of said heater, which combusts said fuel thereby forming said nitrogen oxide-containing fumes.

* * * * *